INVENTOR.
PHILIP G. HUGHES

HIS ATTORNEY

April 21, 1959 P. G. HUGHES 2,882,610
CONTROL SYSTEM FOR CLOTHES DRYERS
Filed March 14, 1958 3 Sheets-Sheet 2

INVENTOR.
PHILIP G. HUGHES
BY
HIS ATTORNEY

April 21, 1959   P. G. HUGHES   2,882,610
CONTROL SYSTEM FOR CLOTHES DRYERS
Filed March 14, 1958   3 Sheets-Sheet 3

INVENTOR.
PHILIP G. HUGHES
BY
HIS ATTORNEY

2,882,610

CONTROL SYSTEM FOR CLOTHES DRYERS

Philip G. Hughes, Anchorage, Ky., assignor to General Electric Company, a corporation of New York Application March 14, 1958, Serial No. 721,383

3 Claims. (Cl. 34—45)

This invention relates to clothes drying machines, and more particularly to automatic control systems for use in such machines for controlling the drying operation.

In one type of automatic control system which is used in domestic clothes drying machines, the drying operation is controlled by the combined functioning of a control thermostat and a timer motor. The control thermostat operates a pair of switches, a timer motor switch and a heater switch, which control respectively the timer motor and the main heater of the dryer during the drying operation. The two switches are operated inversely by the thermostat so that the timer motor is not in operation while the heater is energized and, vice versa, the heater is de-energized when the timer motor is in operation. The trip point, or upper operating temperature of the thermostat, is so chosen that the heater is de-energized only when the clothes in the machine have dried to a considerable extent. The timer motor thus remains inoperative for the greater portion of the drying cycle. When the timer motor is energized, however, it turns toward an off position and when it reaches that position it terminates the dryer operation.

In this control system the trip point of the thermostat is preferably chosen so that when it is reached, a load of light synthetic fabric is almost completely dry. For such fabrics the timer motor may therefore be present so that the timer operates for only a very brief period turning the machine off almost immediately. However, other types of fabric will not shed moisture as quickly as the light synthetic fabrics and need a longer drying period. For example, cottons and linens which form the greater part of most domestic clothes need a somewhat longer drying time than synthetics, and very heavy articles such as bed spreads, shag rugs, dungarees, overalls, etc., shed moisture very slowly and need a still longer drying time than cottons and linens. The control system takes care of the increased increments of drying time needed for these medium and heavy loads by the setting of the timer motor. In other words, for a medium load the timer motor is set to run for a longer time than for a synthetic load, and for a heavy load it runs even longer than for a medium load. The system thus provides for efficiently and correctly drying all kinds of fabrics, with only a minimum of operator judgment being required. Only the timer motor need be set by the operator and that setting is really governed by the type of fabrics being dried.

In an improved form of the control system, described and claimed in my copending application Serial No. 650,789, filed April 4, 1957 and owned by the General Electric Company, the assignee of the present application, the length of time required to dry the medium and heavy types of fabrics is appreciably shortened by the provision of auxiliary thermostatic means arranged in cooperation with heating means which is energized when the main heater is de-energized and the timer motor is running. The effect of the heating means on the auxiliary thermostatic means is to change the operating relationship between the control thermostat and the switches so that a higher temperature than before is required in the dryer before the control thermostat is effective to operate the switches. Thus, each time the timer motor runs, that is, the more times it is cycled on and off inversely with the heater, the higher is the temperature required for the control thermostat to operate the switches and the higher is the temperature maintained within the dryer. This higher temperature results in the fabrics being dried much faster than if the temperature remains constant. Also, since the heating means for the auxiliary thermostat is not energized until the timer motor is energized, the initial trip point of the thermostat is not affected and thus there is no effect on the dryer temperature for light synthetic loads for which the higher temperatures might be unsafe.

In addition to the automatic cycle described above, many modern dryers are including a "de-wrinkle cycle" which may be used to remove wrinkles from synthetic fabrics after they have been washed. This is effected, in essence, by raising the dryer temperature for a suitable time to a point where the synthetic fabric becomes plastic to a sufficient degree for the wrinkles to remove themselves. This de-wrinkling operation is provided in a straight timed operation in which it is important to maintain cycling below a fixed temperature rather than have the temperature increased indefinitely as a result of the action of the auxiliary thermostat. The more obvious means of providing such a construction, is to arrange additional thermostatically controlled contacts to control energization of the main heater; such a construction is a relatively expensive one because of the necessity of having the contacts carry the high currents used for the main heater.

This invention is directed particularly to that improvement whereby, in the type of control provided by my aforementioned application, an additional thermostat for maintaining cycling within a predetermined temperature range controls not the main heater, but the auxiliary heater which is in cooperative relation with the auxiliary thermostat. By so doing, the auxiliary heater is prevented from operating upon actuation of the additional thermostat, and the main heater then operates in its normal manner without further effect by the auxiliary thermostat. The provision of the additional thermostat control in series with the auxiliary heater permits use of an exceedingly economical contact construction due to the very small current associated with the auxiliary heater. The difference in the possible cost of construction of the extra thermostat, depending upon whether it is connected to disconnect the auxiliary heater or in the main heater, can be better understood from the fact that the main heater generally has a resistance as low as 10 ohms, while the auxiliary heater often runs to 4,000 ohms with consequently an exceedingly small current compared to the main heater.

Accordingly, it is an object of my invention to provide an improved control of the above type in which a highly economical arrangement is provided for limiting the amount of temperature rise which can be caused by the auxiliary thermostat and heating means.

Another object of my invention is to provide a control of the type set forth in my aforementioned application, where my novel temperature limiting arrangement may selectively be included or excluded depending upon the type of drying cycle selected.

In carrying out the invention in one form thereof, there is provided a clothes dryer having suitable clothes tumbling means and a heater for supplying heat to extract moisture from the clothes being tumbled. For controlling the dryer, I incorporate within it a control system which includes a timer motor and a main control thermostat. The control thermostat operates a heater switch and a timer motor switch which control respectively the operation of the heater and the timer motor during the drying operation. The thermostat opens the heater switch and closes the timer switch at a relatively high temperature within the dryer, and closes the heater switch and opens the timer switch at a lower temperature within the dryer. With this basic arrangement, as pointed out above, the timer motor is not placed in operation until the dryer has reached a temperature at which the clothes are substantially dried, and the varying increment of time needed thereafter to complete the drying operation for the various types of loads is controlled by the setting of the timer motor, which operates suitable switch means to terminate the dryer operation when it has run for the selected time. The control circuit also includes auxiliary thermostatic means for modifying the action of the control thermostat on the switches, and heating means associated therewith. The heating means is energized through a circuit controlled by one of the timer motor and heater switches so that it is energized concurrently with the timer motor and inversely with the heater. Thus, the longer the timer motor runs, that is, the more times it is cycled on and off inversely with the heater, the higher is the temperature required for the control thermostat to operate the switches and the higher is the temperature provided within the dryer.

In order to provide a limit on the temperature raising action of the auxiliary heating means, I provide means for preventing energization thereof which includes an additional thermostat responsive to the temperature within the dryer. Contact means are controlled by this second auxiliary thermostat and are arranged in the circuit of the auxiliary heating means in series therewith. The contact means are operated to their open position in response to the attainment of a predetermined high temperature by the second auxiliary thermostat. With this arrangement, when the auxiliary heater acting on the auxiliary thermostat has raised the cyling temperature to within the dryer to a predetermined level, the second auxiliary thermostat then opens its contacts to disconnect the auxiliary heater. Thus, the main heater continues to cycle on and off without any increase in the upper limit of its temperature range beyond that previously determined by the second auxiliary thermostat.

The subject matter which I regard as my invention is particularly pointed out and distinctly claimed in the concluding portion of this specification. My invention however, both as to organization and method of operation, together with further objects and advantages thereof, may best be understood by reference to the following description taken in connection with the accompanying drawings in which:

Figure 1:
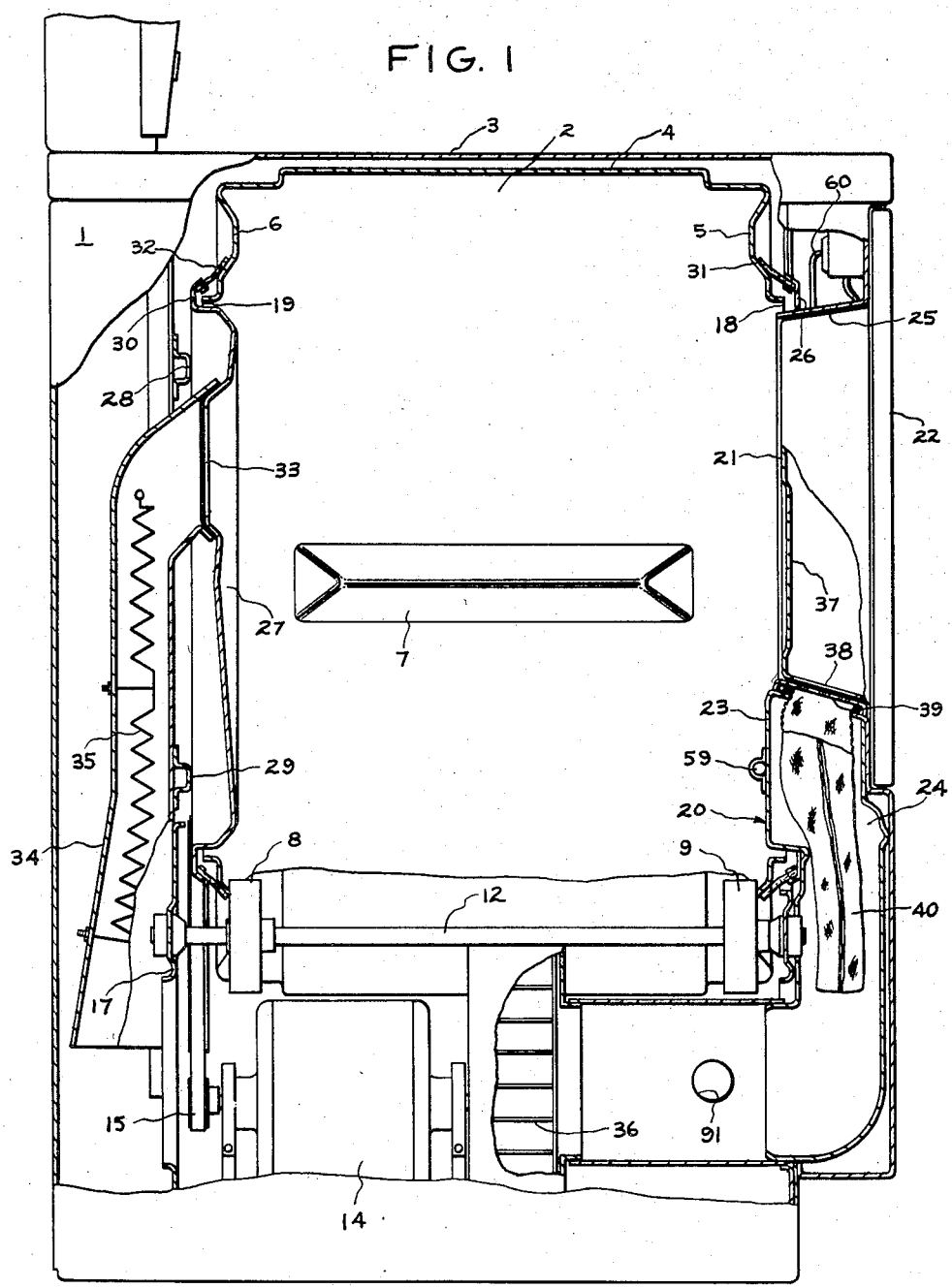
Fig. 1 is a side elevational view of a clothes dryer which is exemplary of the various clothes dryers which may be controlled by my improved control system, the view being partially broken away and partially sectionalized to illustrate details of the dryer.
Figure 2:
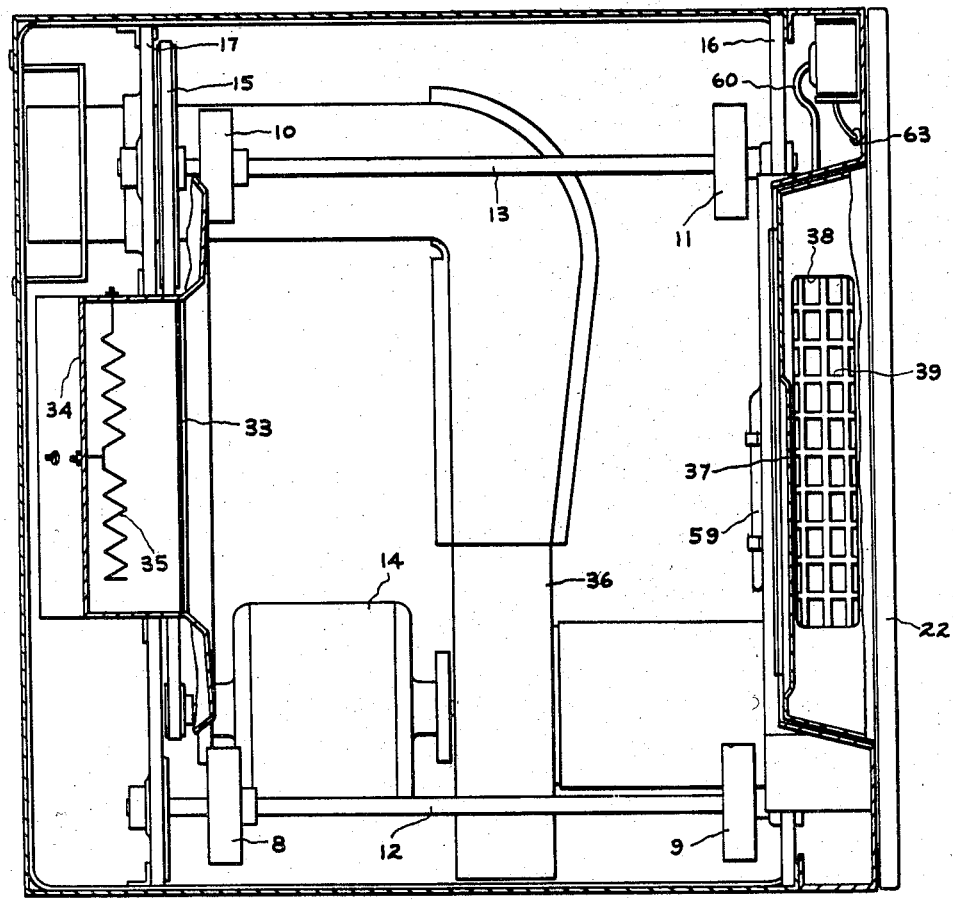
Fig. 2 is a horizontal sectional view of the dryer, with the basket removed and with certain surfaces broken away, and partially sectionalized to illustrate further details.

Referring now to Figs. 1 and 2, I have shown therein a domestic clothes dryer 1, which includes a rotatable open-ended clothes tumbling basket 2. The basket 2 is mounted for rotation about a horizontal axis and is disposed within a suitable outer casing 3 which encloses it on all sides. The basket specifically comprises a cylindrical drum-like member having an outer cylindrical wall 4 and front and rear end walls 5 and 6. The outer cylindrical wall 4 is imperforate over its entire length and on its interior surface is provided with a plurality of clothes tumbling ribs, one of which is shown at 7 in Fig. 1. The clothes basket is rotatably supported within the casing 3 by means of a plurality of rollers 8, 9, 10 and 11. The rollers 8 and 9 are mounted on a rotatable idler shaft 12 and the roller wheels 10 and 11 are mounted on a power shaft 13. The idler shaft 12 has no driving connection but the power shaft 13 is driven from the main drive motor 14 of the machine by means of a belt and pulley connection 15. As shown, both the drive shaft 13 and the idler shaft 12 are supported adjacent the front and rear of the dryer by means of suitable bearings mounted in front and rear support plates 16 and 17. Being freely supported on the roller wheels, it is apparent that the basket 2 will turn or roll thereon whenever the drive shaft 13 is turned by the motor 14. The ratio of the drive and driven pulleys in the drive 15 is suitably chosen so that the basket is rotated at an appropriate speed to provide a clothes tumbling action for the articles of clothing placed therein.

In order that a stream of heated air may be passed through the basket 2 to dry the clothes being tumbled therein, the basket 2 is provided with suitable apertures in its front and rear walls. Specifically, its front end wall 6 is provided with a central aperture 18 and its rear end wall is provided with a similar aperture 19. The front opening 18 is covered or closed by means of a combination bulkhead, generally indicated at 20, which is formed of a number of adjacent members. Specifically, the bulkhead 20 is formed of the inner surface 21 of the access door 22 of the machine, a wall 23 of an outlet duct 24 leading from the basket, a door seat 25 for the door 22, and an annular flange 26 mounted on the door seat and the wall of the duct 24. The annular flange 26, it will be noted, comprises the periphery of the combination bulkhead 20 and it surrounds the opening 18 in the basket. The access door 22 when opened provides for the insertion and removal of clothes from the basket 2.

The rear opening 19 of the basket is likewise closed or covered by a stationary bulkhead. Specifically, it is closed by means of a one-piece bulkhead 27 which is supported from the dryer casing by a pair of cross supports 28 and 29. The outer edge of bulkhead 27, as shown, is defined by a flange 30 which generally surrounds the opening 19.

It will be noted that suitable air seals are provided at both the front and rear of the basket to prevent air leakage. A sealing member 31 mounted on the stationary flange 26 of the front bulkhead slidably engages the basket front wall 5 so as to prevent leakage into the basket through the opening 18. A similar sealing member 32 mounted on the flange 30 of the rear bulkhead engages the rear wall 6 to prevent leakage into the basket through the opening 19. These sealing members 31 and 32, in addition to acting as air seals, also act as thrust bearings for the basket 4. In other words, by their resilience, they hold the basket in its axial position on the rollers 8, 9, 10 and 11.

In order to dry the clothes being tumbled within the basket, a stream of heated air is introduced into it through the rear bulkhead 27, is passed axially across the basket and is then exhausted through the front bulkhead 20. For introducing the air, the rear bulkhead 28 is provided with a screened air inlet opening 33, and mounted behind the bulkhead 27 and leading to this inlet 33 is an air intake duct 34 which has positioned in it an electric heater 35. The intake duct 34 is open at its lower end and the air passes upwardly through it to the opening 33 during the operation of the machine. As the air passes through the duct it is heated by the heater 35 and thus when it flows into the drum through the opening 33 it is at a suitable temperature for drying the clothes. The air incidentally enters the cabinet through a suitable louvered air inlet opening (not shown).

The suction for drawing the air into the basket through the intake duct 34 and the opening 33 is created by means of a centrifugal blower 36 which is driven directly by drive motor 14. To provide the suction, the intake of the blower 36 is connected to the front end of the basket by means of duct 24 and door 22. The door 22 includes an opening 37 in its inner surface 21 which communicates with a second opening 38 in the bottom of the door; this opening 38 is in turn connected to the upper end of duct 24 through an aligned opening 39 in door seat 25. From opening 39 in the door seat the duct 24 leads directly to the intake of the blower. With this duct arrangement, the blower applies a suction at the opening 38 which draws air into the basket through the intake duct 34 and the inlet 33. The air so entering the basket is drawn axially across the basket to the opening 38 and then passes downwardly through the duct 24 to the blower. It will be noted that as the air enters the exhaust duct through the openings 38 and 39 it passes through a fine mesh lint trap 40 which is supported by the door seat and which is effective to remove any lint carried by the air. From the blower, the air is exhausted from the machine through an outlet duct 41 which extends rearwardly to the back wall of the machine. The back wall is provided with a suitable aperture (not shown) to allow for the escape of the air from the machine.

Figure 3:
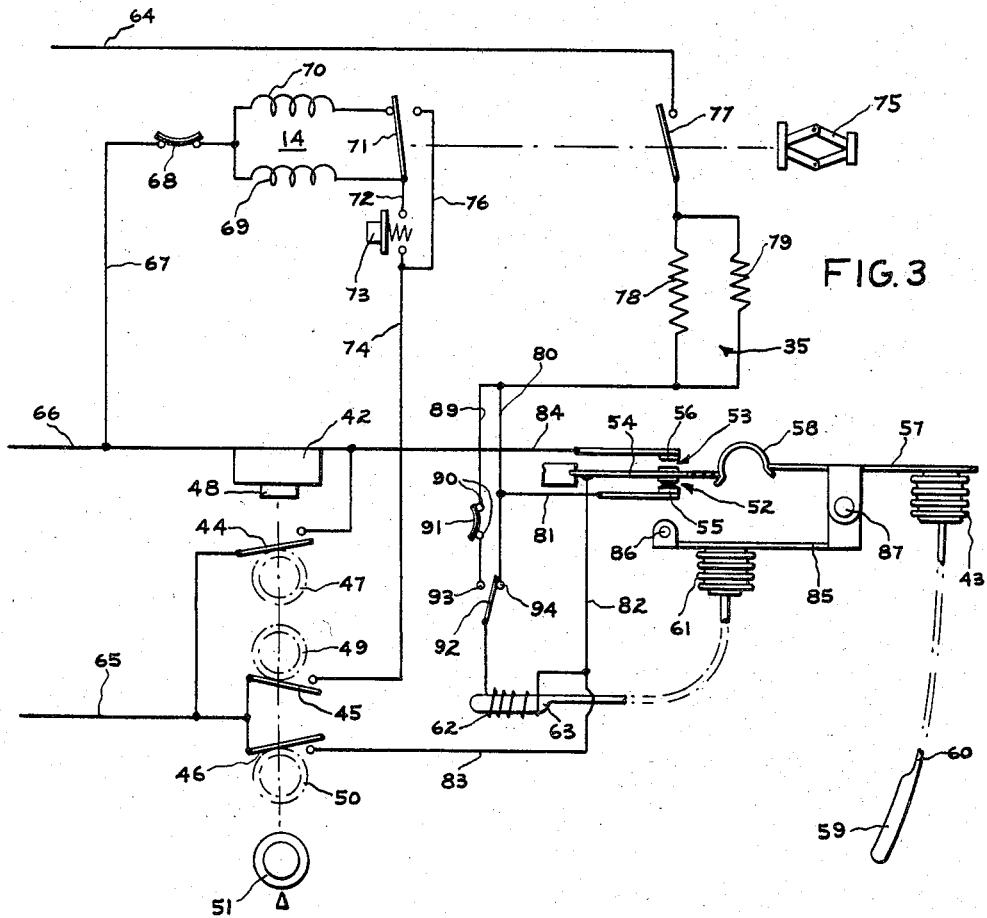
Fig. 3 is a schematic circuit diagram of a preferred embodiment of my improved control system.

The operation of the dryer 1 is controlled by a control system as shown in Fig. 3 which includes two principal control means in the form of a timer motor 42 and a control thermostat 43. The timer motor, which is preferably of the synchronous type, is arranged to operate a pair of switches including a timer motor switch 44, a drive motor switch 45, and a heater switch 46. Switch 44 is operated by a first cam 47 driven by the timer motor through suitable gear reduction means 48, and switches 45 and 46 are operated respectively by second and third cams 69 and 50. The timer motor cams may be manually adjusted by an operator controlled dial 51, the cam shaft being motor driven by a one-way clutch (not shown).

Control thermostat 43 also operates a pair of switches which include heater switch 52 and timer motor switch 53. These switches share a common movable contact 54 which in its lower position closes switch 52 by engagement with contact 55 and in its upper position closes switch 53 by engagement with contact 56. Thermostat 43, which is shown in its cold position, operates contact 54 through a pivoted link 57 which at one end is engaged by the thermostat and at the other end is connected to the movable end of contact member 54 by a toggle spring 58. Spring 58 operates in the manner well known to the art to move contact arm 54 between its upper and lower positions with a snap action in response to movements of arm 57.

Thermostat 43 may, as shown, comprise an expansible hydraulic filled bellows element which is controlled by means of a sensing element 59 connected to it by a suitable line or tube 60. As shown in Figs. 1 and 2, bulb 59 is positioned at the front of the dryer on the bulkhead 20 directly below the air outlet opening 37 from the drum and thus is effective to sense the temperature of the exhaust air leaving the drum. This temperature is very close to the actual clothes temperature.

The relationship between thermostat 43 and the switches which it operates is varied during operation of the dryer by means of a second thermostat 61 which is effective to move the pivot point of link arm 57 so that a higher or lower temperature is required within the dryer at bulb 59 for the control thermostat 43 to operate the contacts. Thermostat 61 coperates with a heater 62 which is positioned in intimate thermal relationship with the sensing bulb 63 of thermostat 61. Energization of heater 62 causes thermostat 61 to adjust link 57 to cause a higher temperature to be required within the dryer for thermostat 43 to open heater switch 52 and close timer switch 53. It will be understood that, for instance, notwithstanding the specific illustration, a bimetallic auxiliary thermostat with proper connections could be used in place of the illustrated hydraulic type thermostat in order to provide the controlling effect.

The entire control system is energized from a three-wire power supply having supply conductors 64 and 65 and a neutral conductor 66. For domestic use the conductors 64 and 65 are normally connected across a 220 volt power supply, with 110 volts appearing between the neutral line 66 and each of these conductors. However, it will of course be understood that elimination of one of the conductors 64 and 65 to provide operation on 110 volts instead of 220 volts, as is frequently provided in commercial form, is also contemplated as being within the invention.

Motor 14 of the machine is energized between neutral line 66 and supply conductor 65. Starting with the neutral line, the circuit extends to the drive motor through conductor 67, and fusible cut-out 68. The motor includes a main winding 69 and a start winding 70 which are connected in parallel through a motor operated centrifugal switch 71 when the machine is at stand still. From switch 71 the circuit extends through a conductor 72, a normally open start switch 73, conductor 74, and the timer operated motor switch 45 to conductor 65.

Assuming switch 45 to be closed, the motor is placed in operation by the operator of the machine closing switch 73. This places line voltage on both windings 69 and 70 and the motor starts to rotate. As it comes up to speed, centrifugal switch 71 is operated by a speed responsive device 75 from the illustrated position, where it connects with windings in parallel, to a second position where it opens start winding 70 and connects main winding 69 through conductor 76 to conductor 74. The motor then continues in operation on the main winding alone with that winding being locked in by switch 71 as long as rotation continues, and with the rotation being independent of switch 73 which is bypassed by conductor 76. Operation of the speed responsive mechanism 75 will also cause movement of a switch arm 77 into engagement with conductor 64. This then energizes the heater 35 across conductors 64 and 65: starting with conductor 64, the circuit extends through switch 77, the two parallel resistors 78 and 79 of the heater, conductors 80 and 81, contacts 55 and 54 of switch 52 (which are normally closed at the start of the drying operation because thermostat 43 when cold has operated pivoted arm 57 so as to close that switch), conductors 82 and 83, and heater switch 46 controlled by the timer motor. Thus, the heater 35 will heat the air being passed through the dryer drum.

Timer motor 42 at the start of the drying operation is not energized since no circuit is completed therethrough (switch 44 being open). However, when the exhaust air temperature rises sufficiently to cause thermostat 43 to open switch 52 and close switch 53, the timer motor is then energized between the neutral conductor 66 and the supply conductor 65: starting from conductor 66, the circuit extends through conductor 84, contacts 56 and 54, conductors 82 and 83, and switch 46. With switch 53 thus aranged, it can be seen that it must be closed and that switch 52 must be opened by thermostat 43 in order for the timer motor to be energized with the switch 44 open as illustrated. Once the exhaust temperature has reached a point where the thermostat 43 trips contact 54 to open switch 52 and close switch 53, the timer motor thus begins to run and heater 35 is de-energized. The timer motor continues in operation until such time as the exhaust temperature falls low enough to cause resetting of thermostat 43 to reclose switch 52 and open switch 53.

As described in my aforementioned application, I provide auxiliary thermostat 61 to raise the temperature at which thermostat 43 will trip after the first time. This may be done, as shown, by means of a link 85 engaged inermediate its ends by auxiliary thermostat 61. The link is pivoted at its one end 86 to a stationary support and at its other end is pivoted to link 57 by a pivot 87. With this relationship, upon the expansion of the bellows of thermostat 61, the relationship between thermostat 43 and contact 54 is changed so that thermostat 43 has to expand farther to operate contact 54 from engagement with contact 55 and into engagement with contact 56. In other words, the temperature within the dryer rises to a higher level to cause opening of the heater circuit and closing of the timer motor circuit thereby providing a higher dryer temperature.

Figure 4:
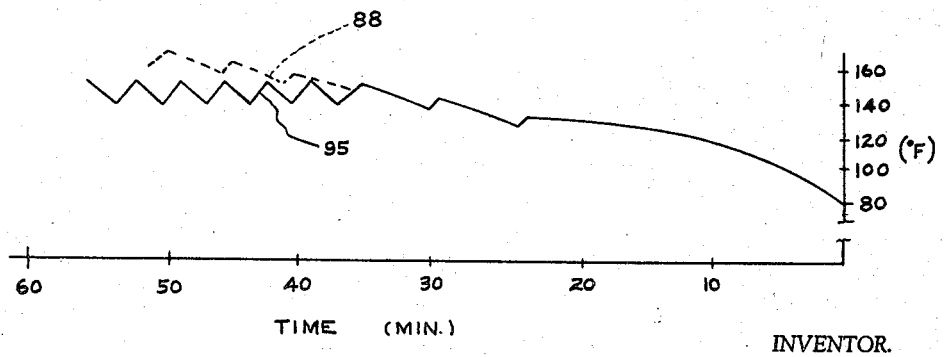
Fig. 4 is a chart showing the results obtained from my improved control system as compared with the system of my aforementioned application which did not embody the present invention.

With this arrangement, thermostat 61 expands as the timer continues to run. Also, the heater 62 and bulb 63 contain enough thermal inertia so that the bulb does not cool off to its initial temperature each time the heater is de-energized. Thus as the timer motor is cycled on and off, thermostat 61 continues to raise the temperature required for the main control thermostat to operate the switches. In other words, each time the timer motor is cycled on and off the temperature within the dryer is increased. This can plainly be seen by reference to the diagram of Fig. 4 where the dotted line 88 illustrates an operation produced by the control system as thus far described.

In order to limit the temperature rise for the various purposes as described above, I provide the following addition to the above control circuit. In parallel with the heating elements 78 and 79 of heater 35 I provide a circuit including a conductor 89 and contacts 90 which are intended to be connected together by suitable thermostatically controlled means such as, for instance, bimetallic disk 91. Disk 91 is appropriately located so as to be responsive to temperature changes within the dryer. This may be effected, for instance, as shown, by positioning the disk adjacent blower 36 so that after the air has passed through the clothes being dried it shortly thereafter passes over the disk 91.

A switch arm 92 is arranged to be engagable with either of contacts 93 or 94. Switch arm 92 is connected directly in series with auxiliary heater 62, and when it engages contact 93 it places the thermostat 91 directly in series with the auxiliary heater 62. When switch arm 92 engages contact 94 the thermostat 91 is bypassed, and is thus ineffective to control the action of heating element 62. When switch 92 engages contact 93, a definite upper limit is provided for the increasing temperature within the dryer. This results because the rise in temperature is a direct result of the presence of heating element 62, and this element ceases to be effective when disk 91 causes opening of contact 90. Thus, the thermostat 91 is effective to provide an upper level of temperature within the dryer at relatively small expense since the current through heating element 62 is exceedingly small compared with that through heater 35, and the construction of contacts 90 and thermostat 91 need only be effective to withstand the smaller current.

There are two main instances where the construction described is effective and desirable. The first is the relatively obvious one of providing an upper limit to the temperature to be provided within the dryer regardless of the type of clothes load. It will be understood that if this is the only advantage desired from the arrangement, disk 91 may be permanently connected in series with heater 62. However, as mentioned above, clothes dryers are now frequently provided with two separate cycles, one of which is the automatic cycle which forms the basis of this discussion and the other of which is a de-wrinkle cycle where the timer runs throughout the cycle, i.e., the cycle lasts for a predetermined period of time. It is clear that the temperature would rise to an undesirable extent with the timer motor running continuously and thus with heater 62 continually energized. For this reason, where such a de-wrinkle cycle is provided, the economical temperature limiting effect provided by thermostat 91 is of prime importance in permitting use of both a dewrinkle cycle and an automatic cycle at the least possible additional expense.

For the dewrinkle cycle, switch 44 is closed so that timer 42 runs continuously regardless of the action of the thermostat 43. Switch 92 engages contact 93 so that the thermostat 91 is in series with heating coil 62, and the rise in temperature within the dryer is thus limited to the desired extent, as shown by solid line 95 in the diagram of Fig. 4. When the automatic cycle is to be provided, switch arm 92 is moved back to engage contact 94, bypassing the thermostat 91 and permitting heating of coil 62 whenever timer motor 42 is running; this permits thermostat 61 to raise the cycling temperature within the dryer as long as the operation continues.

While in accordance with the patent statutes I have described what at present is considered to be the preferred embodiment of my invention, it will be obvious to those skilled in the art that various changes and modifications may be made therein without departing from the invention.

It is therefore aimed in the appended claims to cover all such equivalent variations as fall within the true spirit and scope of the invention.

What I claim as new and desire to secure by Letters Patent of the United States is:

1. In a clothes dryer, clothes tumbling means, a heater for supplying heat for drying the clothes being tumbled, a control system for controlling the operation of the dryer comprising a timer motor, a control thermostat responsive to the temperature within the dryer, a heater switch and a timer motor switch both operated by said control thermostat and controlling respectively the operation of said heater and said timer motor during the drying operation, said control thermostat opening said heater switch and closing said timer switch at a relatively high temperature within said dryer and closing said heater switch and opening said timer switch at a lower temperature within said dryer whereby said heater and said timer motor are cycled inversely in response to the dryer temperature, auxiliary thermostatic means arranged when heated to increase the temperature at which said control thermostat actuates said switches, heating means arranged for heating said auxiliary thermostatic means, a circuit controlled by one of said timer motor and heater switches for energizing said heating means concurrently with said timer motor whereby the longer the timer motor is in operation the more modified is the actuation of said switches by said control thermostat and the higher is the temperature maintained within said dryer, means for preventing energization of said heating means comprising second auxiliary thermostatic means responsive to the temperature within the dryer, contact means controlled by said second auxiliary thermostatic means arranged in said circuit in electrical series relation with said heating means, said second auxiliary thermostatic means opening said contact means at a predetermined temperature, and switch means operated by said timer motor for deenergizing said heater, said clothes tumbling means and said timer motor to terminate the dryer operation.

2. In a clothes dryer, clothes tumbling means, a heater for supplying heat for drying the clothes being tumbled, a control system providing two cycles for controlling the operation of the dryer comprising a timer motor, a control thermostat responsive to the temperature within the dryer, a heater switch and a timer motor switch both operated by said control thermostat, said heater switch and said timer motor switch controlling respectively the operation of said heater and said timer motor during a drying operation in the first cycle, said timer motor running continuously and said control thermostat controlling the operation of said heater alone during the second cycle, said control thermostat in said first cycle opening said heater switch and closing said timer switch at a relatively high temperature within said dryer and closing said heater switch and opening said timer switch at a lower temperature within said dryer whereby said heater and said timer motor are cycled inversely in response to the dryer temperature, auxiliary thermostatic means arranged when heated to increase the temperature at which said control thermostat actuates said switches, heating means arranged for heating said auxiliary thermostatic means, a circuit controlled by one of said timer motor and heater switches for energizing said heating means concurrently with said timer motor whereby the longer the timer motor is in operation the more modified is the actuation of said switches by said control thermostat and the higher is the temperature maintained within said dryer, means for preventing energization of said heating means comprising second auxiliary thermostatic means responsive to the temperature within the dryer, contact means controlled by said second auxiliary thermostatic means arranged in said circuit in electrical series relation with said heating means, said second auxiliary thermostatic means opening said contact means at a predetermined temperature, a switch member movable to first and second positions for said first and second cycles respectively, said switch member in said first position removing said contact means from said circuit thereby to preclude any effect on said heater as a result of operation of said second auxiliary thermostatic means, said switch member in said second position completing the series relation between said contact means and said heating means thereby to place said heating means under the control of said second auxiliary thermostatic means, and switch means operated by said timer motor for deenergizing said heater said clothes tumbling means and said timer motor to terminate the dryer operation.

3. In a clothes dryer, clothes tumbling means, a heater, air moving means for circulating a stream of air over said heater and through said tumbling means for drying the clothes therein, a control system for controlling the operation of the dryer comprising a timer motor, a control thermostat responsive to the temperature within the dryer, a heater switch and a timer motor switch for controlling respectively the operation of said heater and said timer motor during the drying operation, linkage means actuated by said control thermostat for operating both said heater switch and said timer motor switch, said control thermostat opening said heater switch and closing said timer switch at a relatively high temperature within said dryer and closing said heater switch and opening said timer switch at a lower temperature within said dryer whereby said heater and said timer motor are cycled inversely in response to the dryer temperature, auxiliary thermostatic means arranged when heated to adjust said linkage to increase the temperature at which said control thermostat actuates said switches, heating means arranged for heating said auxiliary thermostatic means, a circuit controlled by one of said timer motor and heater switches for energizing said heating means concurrently with said timer motor whereby the longer the timer motor operates the higher is the temperature maintained within said dryer by said control thermostat, means for preventing energization of said heating means comprising a bimetallic element positioned to be responsive to the temperature within the dryer, contact means controlled by the position of said bimetallic element arranged in said circuit in electrical series relation with said heating means, said bimetallic element opening said contact means at a predetermined temperature thereby to limit the effect of said auxiliary thermostatic means on said control thermostat, and switch means operated by said timer motor for deenergizing said heater said timer motor said tumbling means and said air moving means to terminate the dryer operation.

References Cited in the file of this patent
UNITED STATES PATENTS

| | | |
|---|---|---|
| 2,328,974 | Guler | Sept. 7, 1943 |
| 2,505,041 | Gorsuch | Apr. 25, 1950 |
| 2,743,532 | Steward | May 1, 1956 |